United States Patent
Kato et al.

(10) Patent No.: US 12,552,335 B2
(45) Date of Patent: Feb. 17, 2026

(54) WIRING HARNESS

(71) Applicant: YAZAKI CORPORATION, Tokyo (JP)

(72) Inventors: Mitsunobu Kato, Makinohara (JP); Naoto Kogure, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 196 days.

(21) Appl. No.: 18/646,756

(22) Filed: Apr. 26, 2024

(65) Prior Publication Data
US 2024/0383419 A1    Nov. 21, 2024

(30) Foreign Application Priority Data

May 17, 2023 (JP) ................. 2023-081215

(51) Int. Cl.
*B60R 16/027* (2006.01)
*B60R 16/02* (2006.01)
*H01B 7/00* (2006.01)
*H02G 11/00* (2006.01)

(52) U.S. Cl.
CPC ........ *B60R 16/027* (2013.01); *B60R 16/0215* (2013.01); *H01B 7/0045* (2013.01); *H02G 11/00* (2013.01)

(58) Field of Classification Search
CPC ... B60R 16/027; B60R 16/0215; B60R 16/02; H02G 11/00; H02G 11/006; B60J 5/06; B60J 5/047; E05D 11/0081
See application file for complete search history.

(56) References Cited

U.S. PATENT DOCUMENTS

| | | | | |
|---|---|---|---|---|
| 4,653,799 A | * | 3/1987 | Arai | B60J 5/047 49/248 |
| 5,879,047 A | * | 3/1999 | Yamaguchi | B60R 16/0215 296/146.7 |
| 5,884,961 A | * | 3/1999 | Serizawa | B60R 16/0207 296/146.7 |
| 5,921,782 A | * | 7/1999 | Yamaguchi | H02G 11/00 174/72 A |

FOREIGN PATENT DOCUMENTS

JP    2001-151042 A    6/2001

* cited by examiner

*Primary Examiner* — Paresh Paghadal
(74) *Attorney, Agent, or Firm* — KENEALY VAIDYA LLP

(57) ABSTRACT

The main protector member includes: a torsion-allowing portion, when the open/close body is opened from the fully closed position to the fully opened position, inwardly allowing a torsional deformation of the harness body that follows the rotation of the arm member; and a bend-allowing portion, when the open/close body is opened from the fully closed position to the fully opened position, inwardly allowing bending deformation of the harness body that follows the rotation of the arm member, and the torsion-allowing portion is disposed in a position outside of an operational area of the arm member during opening and closing of the open/close body, in a virtual arm operational area of a circular shape made by rotating 360 degrees the arm member around the axis of the pivot point.

10 Claims, 13 Drawing Sheets

WIRING HARNESS

CROSS-REFERENCE TO RELATED APPLICATION(S)

The present application claims priority to and incorporates by reference the entire contents of Japanese Patent Application No. 2023-081215 filed in Japan on May 17, 2023.

BACKGROUND OF THE INVENTION

1. Field of the Invention

The present invention relates to a wiring harness.

2. Description of the Related Art

Conventionally, a wiring harness is known that is routed across and between a support body and an open/close body, the open/close body being opened and closed while rotating around an axis of a pivot point provided on the support body via an arm member of a link mechanism. For example, vehicles such as an automobiles are equipped with wiring harnesses that electrically connect power supplies (such as secondary batteries) and electrical components on a side of a vehicle body as a support body to switches and electrical components on a side of a slide door as a rotating body. This type of wiring harness is disclosed, for example, in Japanese Patent Application Laid-open No 2001-151042.

Conventional wiring harnesses are raised near the pivot point within an operational area of the arm member in parallel to a pivot shaft of the pivot point, and the wiring harnesses are bent at an end of the being raised and routed along the arm member to the slide door as a rotating body. Therefore, in the wiring harness, the torsion angle of the raised portion to be torsionally deformed (hereinafter referred to as "torsionally deformed portion") may increase, and cause a decrease in durability.

SUMMARY OF THE INVENTION

Therefore, an object of the present invention is to provide a wiring harness that can suppress decrease in durability.

In order to achieve the above mentioned object, a wiring harness according to one aspect of the present invention includes a harness body that is routed across and between a support body and an open/close body, the open/close body being opened and closed while rotating an arm member of a link mechanism around an axis of a pivot point provided on the support body via the link mechanism, and electrically connects a first electrical connection object installed in the support body to the second electrical connection object installed in the open/close body; and a protector that protects the harness body by introducing the harness body into an inward space thereof, wherein the harness body is passed along the arm member between the support body side and the open/close body side during the rotation of the arm member around an axis of the pivot point due to opening and closing of the open/close body between a fully closed position and a fully opened position, the protector includes a main protector member fixed to the support body and introduces the harness body into an inward space, the main protector member has a torsion-allowing portion, the torsion-allowing portion inwardly guiding the harness body along a parallel axis spaced parallel to the pivot shaft of the pivot point, and when the open/close body is opened from the fully closed position to the fully opened position, inwardly allowing a torsional deformation of the harness body that follows the rotation of the arm member, and a bend-allowing portion, the bend-allowing portion allowing, while bending, the harness body extracted out from the torsion-allowing portion to the second electrical connection object side, to head to the arm member, and when the open/close body is opened from the fully closed position to the fully opened position, inwardly allowing bending deformation of the harness body that follows the rotation of the arm member, and the torsion-allowing portion is disposed in a position outside of an operational area of the arm member during opening and closing of the open/close body, in a virtual arm operational area of a circular shape made by rotating 360 degrees the arm member around the axis of the pivot point.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
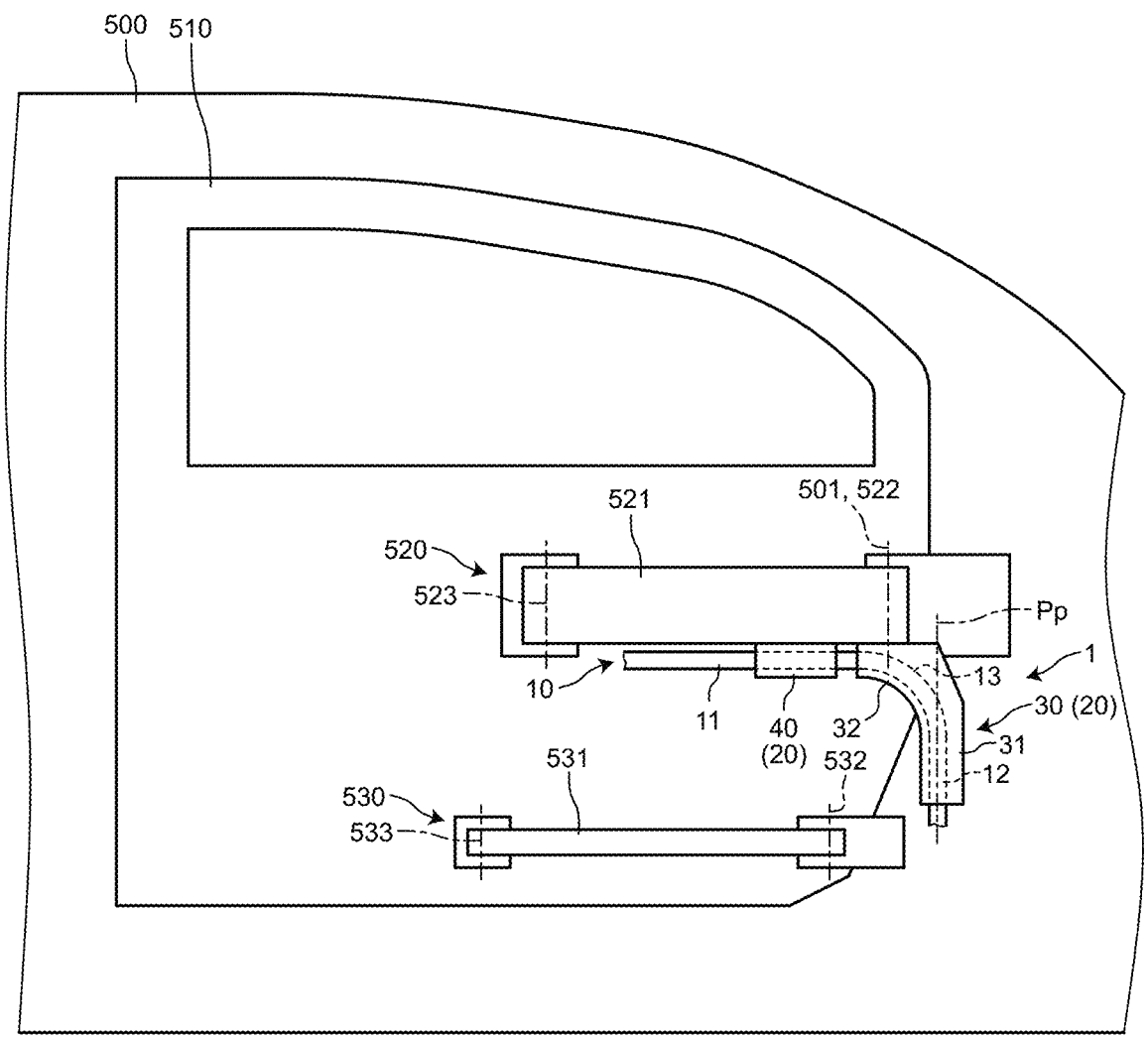
FIG. 1 is a schematic diagram of a wiring harness according to an embodiment as viewed from a vehicle interior when a slide door is in a fully closed position.

The following describes in detail an embodiment of a wiring harness according to the present invention with reference to the drawings. Note that the embodiment does not intend to limit the present invention.

Embodiment

One embodiment of a wiring harness according to the present invention will be described based on FIGS. 1 to 13.

Symbol 1 in FIGS. 1 to 13 denotes a wiring harness according to the present embodiment.

The wiring harness 1 includes a harness body 10 that is routed across and between a support body 500 and an open/close body 510 and that electrically connects a first electrical connection object (not illustrated) installed in the support body 500 to a second electrical connection object (not illustrated) installed in the open/close body 510 (FIGS. 1 to 4). A link mechanism 520 is provided between the support body 500 and the open/close body 510, the link mechanism 520 connecting them and causing the open/close body 510 to be opened and closed between the fully closed position and the fully opened position with respect to an opening of the support body 500 (FIGS. 1 to 4). The open/close body 510 is opened and closed via the link mechanism 520 while rotating an arm member 521 of the link mechanism 520 around an axis of a pivot point 501 provided on the support body 500 (FIGS. 1 to 4).

For example, vehicles such as automobiles are known that are equipped with slide doors enabling sliding operations (reciprocating movement in a sliding direction) with respect to vehicle bodies. In this vehicle, the slide door is opened and closed between the fully closed position and the fully opened position with respect to a door opening of the vehicle body while the slide door is reciprocating in the sliding direction with respect to the vehicle body via at least one link mechanism provided between the vehicle body and the slide door. In the following description, as examples of the support body 500 and the open/close body 510, a vehicle body 500 and a slide door 510 are described.

As exemplified by the support body 500 and the open/close body 510, the first electrical connection object exemplified here is a power source (such as a secondary battery), electrical components, or the like installed in the vehicle body 500. For example, the electrical components on the vehicle body 500 side are audio equipment associated with speakers in the slide door 510, a drive unit that drives a power seat, and the like. On the other hand, the second electrical connection object exemplified here is an electrical component, a switch, or the like installed in the slide door 510. For example, the electrical components of the slide door 510 are a drive unit that drives a power window, a speaker, and the like. The switches on the slide door 510 are a switch that activates the power window, a switch that activates the power seat, and the like.

The vehicle exemplified here includes two link mechanisms. The vehicle includes the link mechanism (hereinafter referred to as "main link mechanism") 520, and a link mechanism (hereinafter referred to as "sub link mechanism") 530 disposed on a lower side of the vehicle at a distance from the main link mechanism 520 (FIGS. 1 to 4). In the vehicle described here, the main link mechanism 520 and the sub link mechanism 530 cause the slide door 510 on a side of the vehicle to open and close with respect to the door opening on a side of the vehicle body 500 while sliding the slide door 510 in a front-rear direction of the vehicle.

The main link mechanism 520 and the sub link mechanism 530 each include various link members for connecting the vehicle body 500 and the slide door 510 together and opening and closing the slide door 510 with respect to the door opening of the vehicle body 500 while sliding the slide door 510 with respect to the vehicle body 500. The main link mechanism 520 and the sub link mechanism 530 each include, as their various link members, at least one arm member rotatably supported about an axis with respect to the pivot point 501 of the vehicle body 500. For example, the main link mechanism 520 includes, as its arm member, the arm member (hereinafter referred to as "main arm member") 521 that is already described (FIGS. 1 to 4). The sub link mechanism 530 includes an arm member 531 as an arm member thereof (hereinafter referred to as "sub arm member") (FIG. 1).

Between the vehicle body 500 and one end of the main arm member 521 on the vehicle body 500 side, a pivot shaft 522 that is a pivot shaft at the pivot point 501 of the vehicle body 500 is provided, and the pivot shaft 522 (hereinafter referred to as "body-side pivot shaft") rotatably supports one end of the main arm member 521 about an axis with respect to the vehicle body 500 at the pivot point 501 (FIGS. 1 to 4). In addition, between the slide door 510 and the other end of the main arm member 521 on the slide door 510 side, a pivot shaft 523 is provided, and the pivot shaft 523 (hereinafter referred to as "door-side pivot shaft") rotatably supports the other end of the main arm member 521 about an axis with respect to the slide door 510 (FIGS. 1 to 4). The main arm member 521 is extended in a front-rear direction of the vehicle when the slide door 510 is in a fully closed position. The body-side pivot shaft 522 and the door-side pivot shaft 523 are disposed with a vehicle vertical direction as an axial direction.

Between the vehicle body 500 and one end of the sub arm member 531 on the vehicle body 500 side, a pivot shaft 532 is provided, and the pivot shaft 532 (hereinafter referred to as "body-side pivot shaft") rotatably supports the one end of the sub arm member 531 about an axis with respect to the vehicle body 500 (FIG. 1). In addition, between the slide door 510 and the other end of the sub arm member 531 on the slide door 510 side, a pivot shaft 533 is provided, and the pivot shaft 533 (hereinafter referred to as the "door-side pivot shaft") rotatably supports the other end of the sub arm member 531 about an axis with respect to the slide door 510 (FIG. 1). The sub arm member 531 is extended in the front-rear direction of the vehicle when the slide door 510 is in the fully closed position. The body-side pivot shaft 532 and the door-side pivot shaft 533 are disposed with a vehicle vertical direction as an axial direction.

The main link mechanism 520 and the sub link mechanism 530 each may have various link members that each include a plurality of arm members, and each may be a simplified model in which the various link members are simplified by a single arm member (main arm member 521 or sub arm member 531, for example).

In this vehicle, for example, an output torque of a rotating machine (not illustrated) as a drive source is transmitted to the body-side pivot shaft 522 of the main link mechanism 520 to rotate the main arm member 521 around the axis of the pivot point 501, so that the slide door 510 is operated to slide with respect to the vehicle body 500.

The wiring harness 1 includes a harness body 10 that is routed across and between the vehicle body 500 and the slide door 510 (FIGS. 1 to 4). Furthermore, the wiring harness 1 includes a protector 20 that protects the harness body 10 by introducing the harness body 10 into an inward space thereof (FIGS. 1 to 4).

This wiring harness 1 allows one terminal of the harness body 10 to be electrically connected directly or indirectly to the first electrical connection object, and allows the other terminal of the harness body 10 to be electrically connected directly or indirectly to the second electrical connection object. The harness body 10 may consist only of a bundle of a plurality of wires, the entire bundle of wires may be covered with an exterior component such as corrugated tubing, or the bundle of wires may be partially covered with one or more exterior components. The harness body 10 may consist of only one wire.

Figure 2:
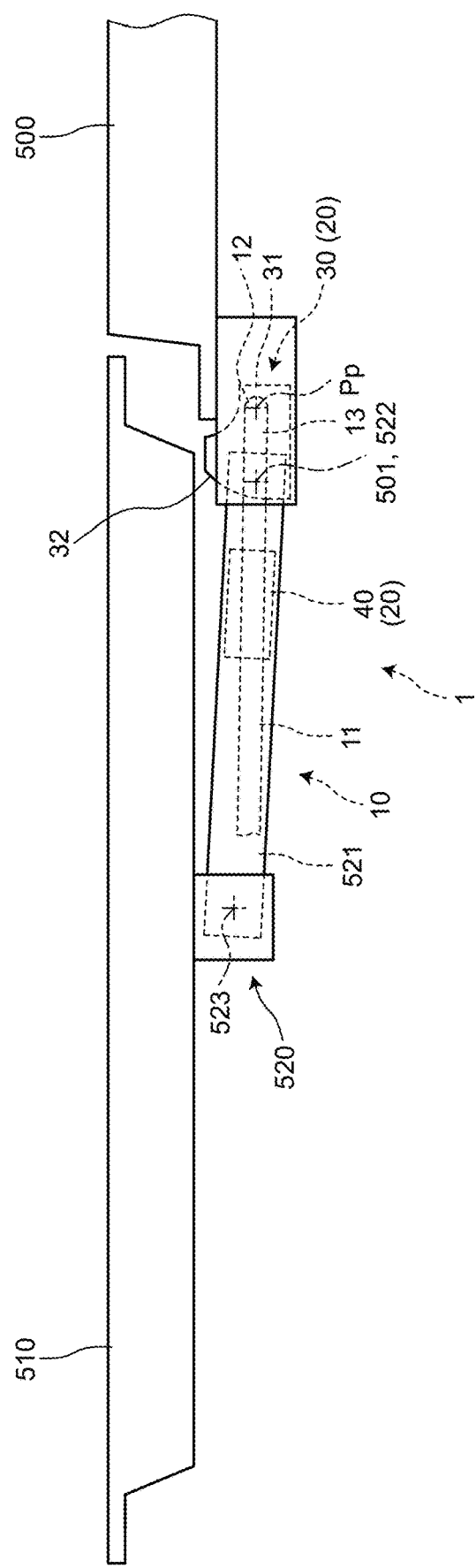
FIG. 2 is a schematic diagram of the wiring harness according to the embodiment as viewed from above the vehicle when the slide door is in the fully closed position.
Figure 3:
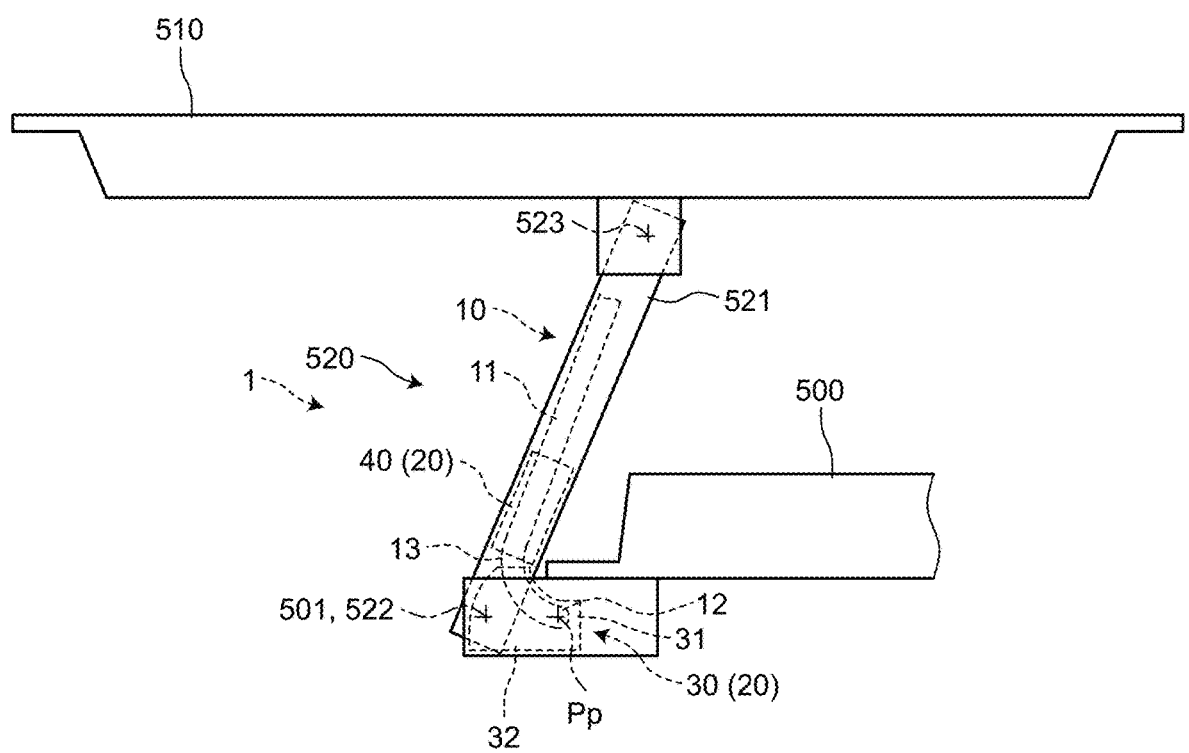
FIG. 3 is a schematic diagram of the wiring harness according to the embodiment as viewed from above the vehicle when the slide door is in a fully opened position.
Figure 4:
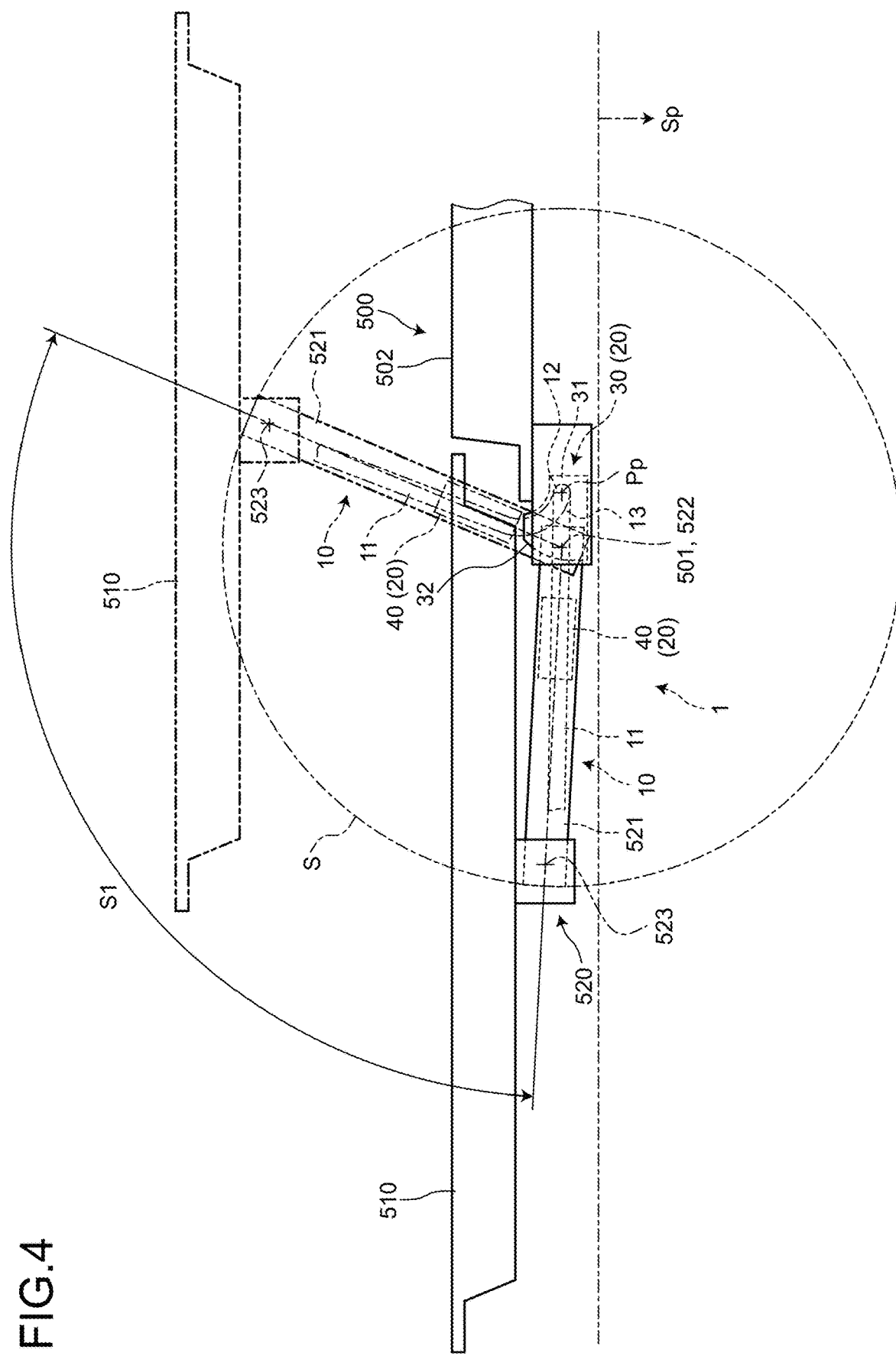
FIG. 4 is an explanatory diagram describing an arrangement of a torsion-allowing portion.
Figure 5:
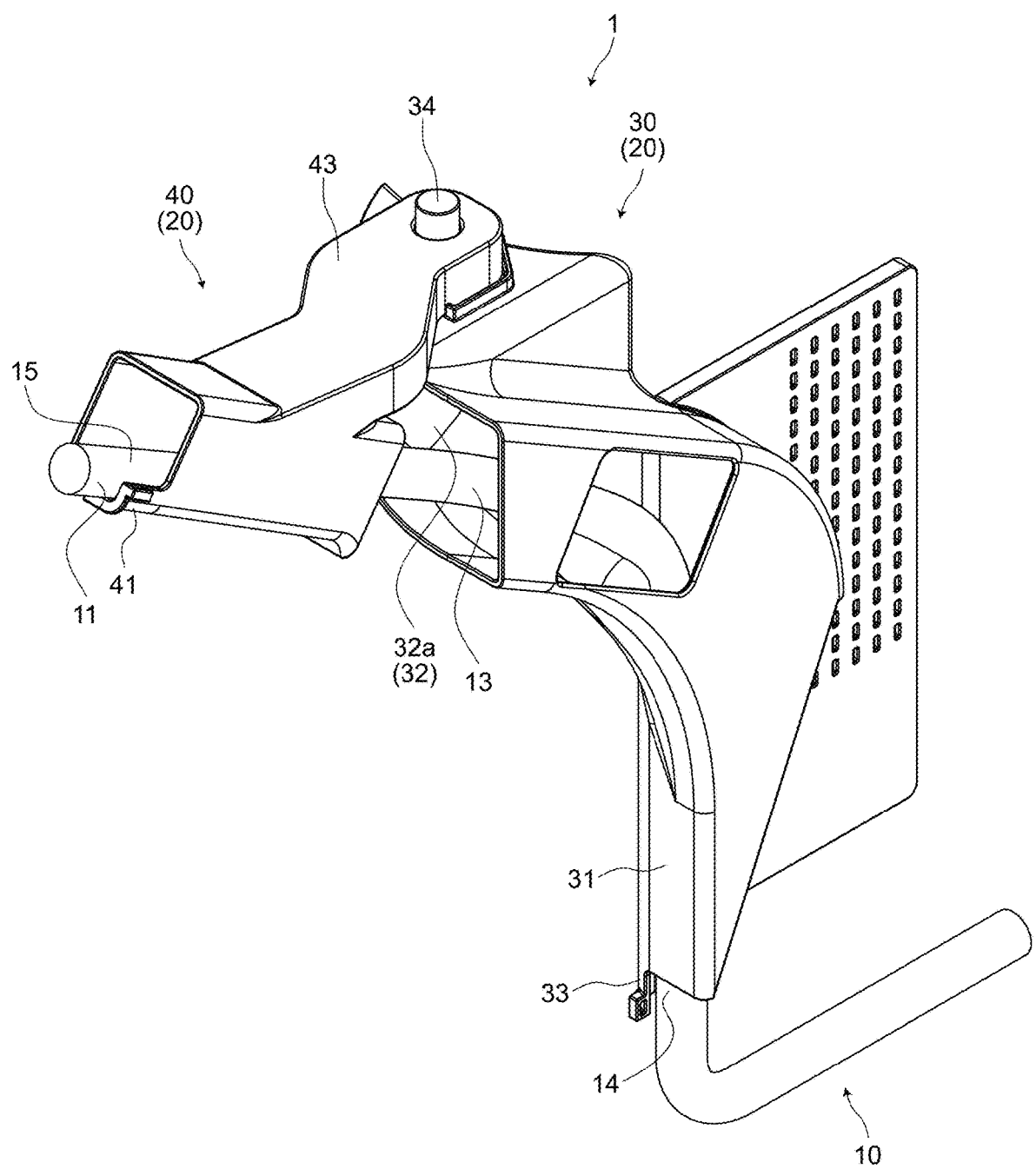
FIG. 5 is a perspective view illustrating the wiring harness according to the embodiment when the slide door is in the fully closed position.
Figure 6:
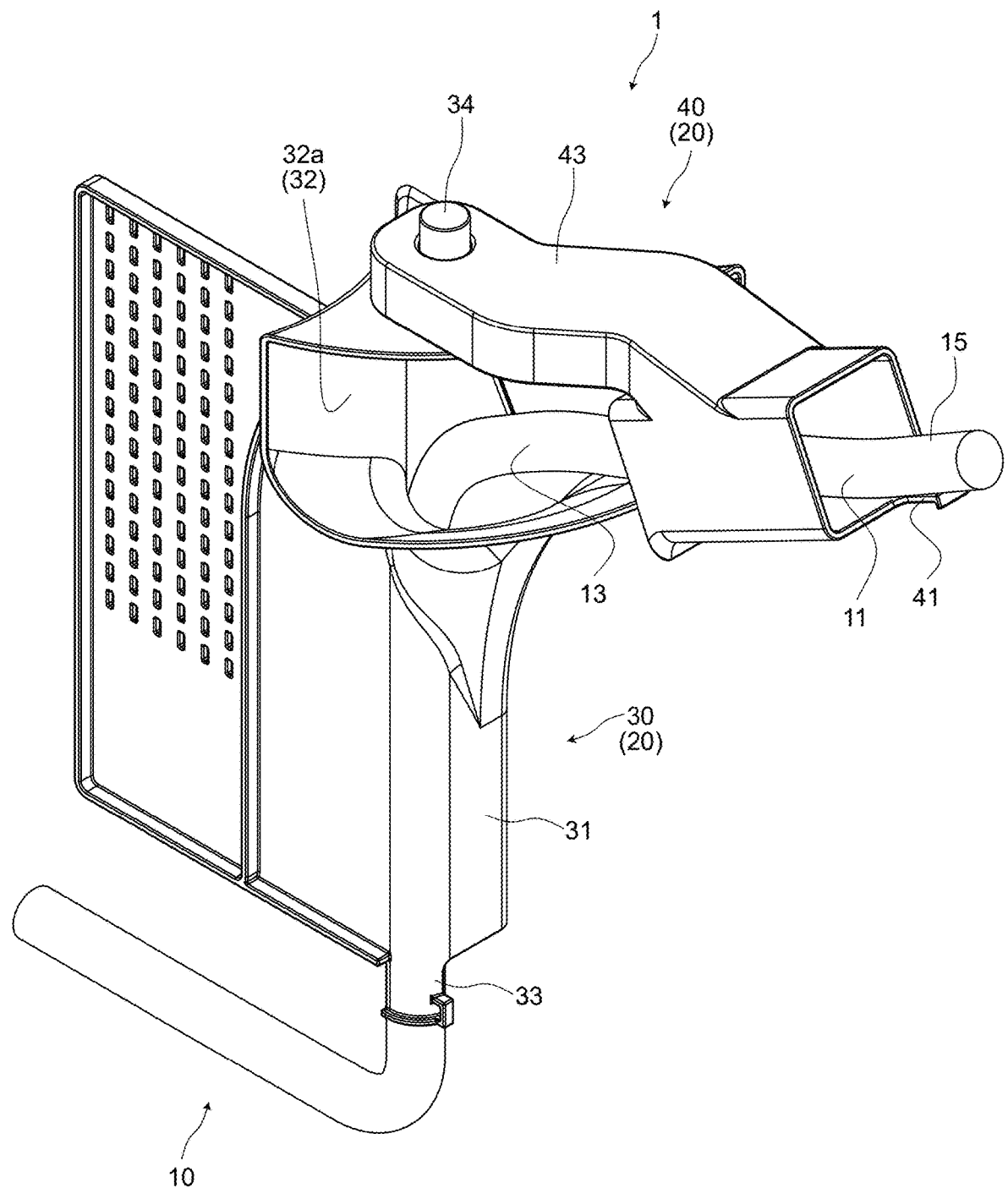
FIG. 6 is a perspective view of the wiring harness according to the embodiment as viewed from a different angle when the slide door is in the fully closed position.
Figure 7:
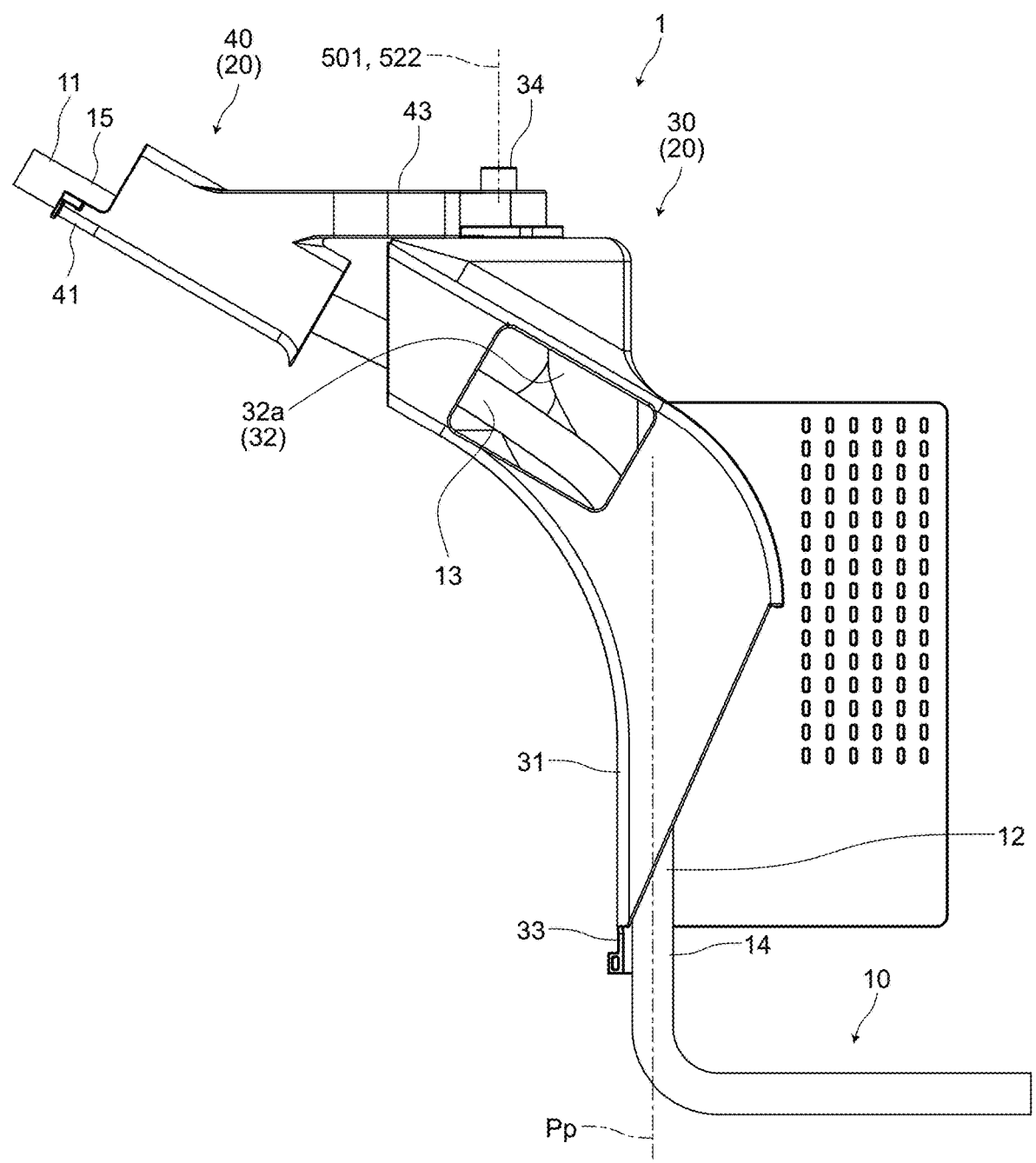
FIG. 7 is a plan view of the wiring harness according to the embodiment as viewed from the vehicle interior when the slide door is in the fully closed position.
Figure 8:
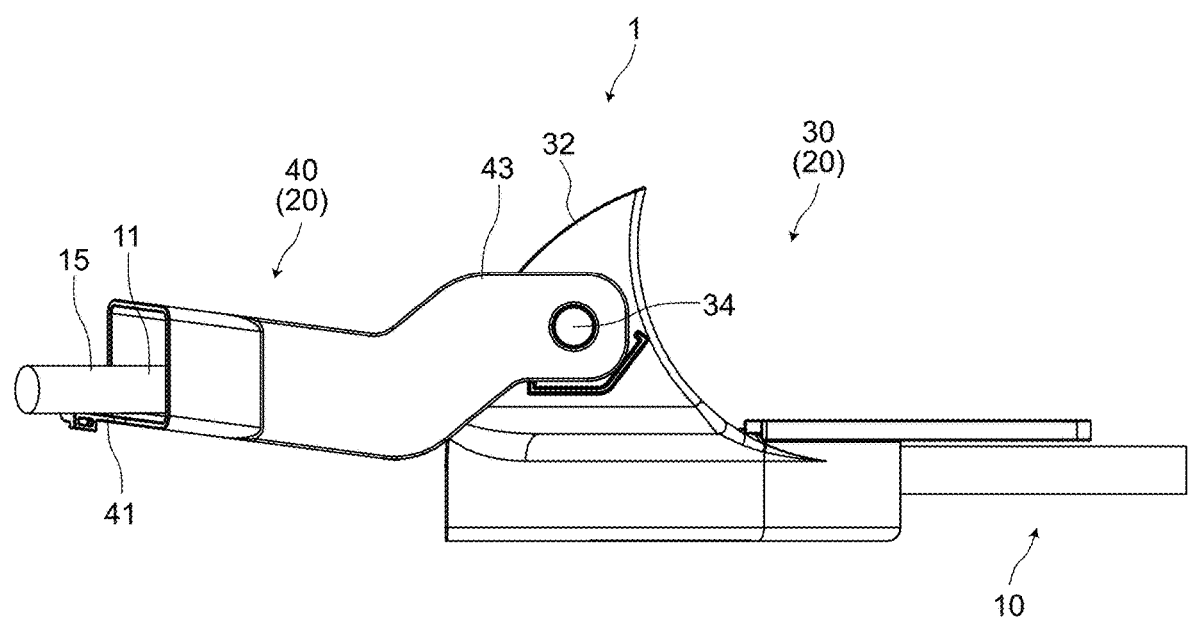
FIG. 8 is a plan view of the wiring harness according to the embodiment as viewed from above the vehicle when the slide door is in the fully closed position.
Figure 9:
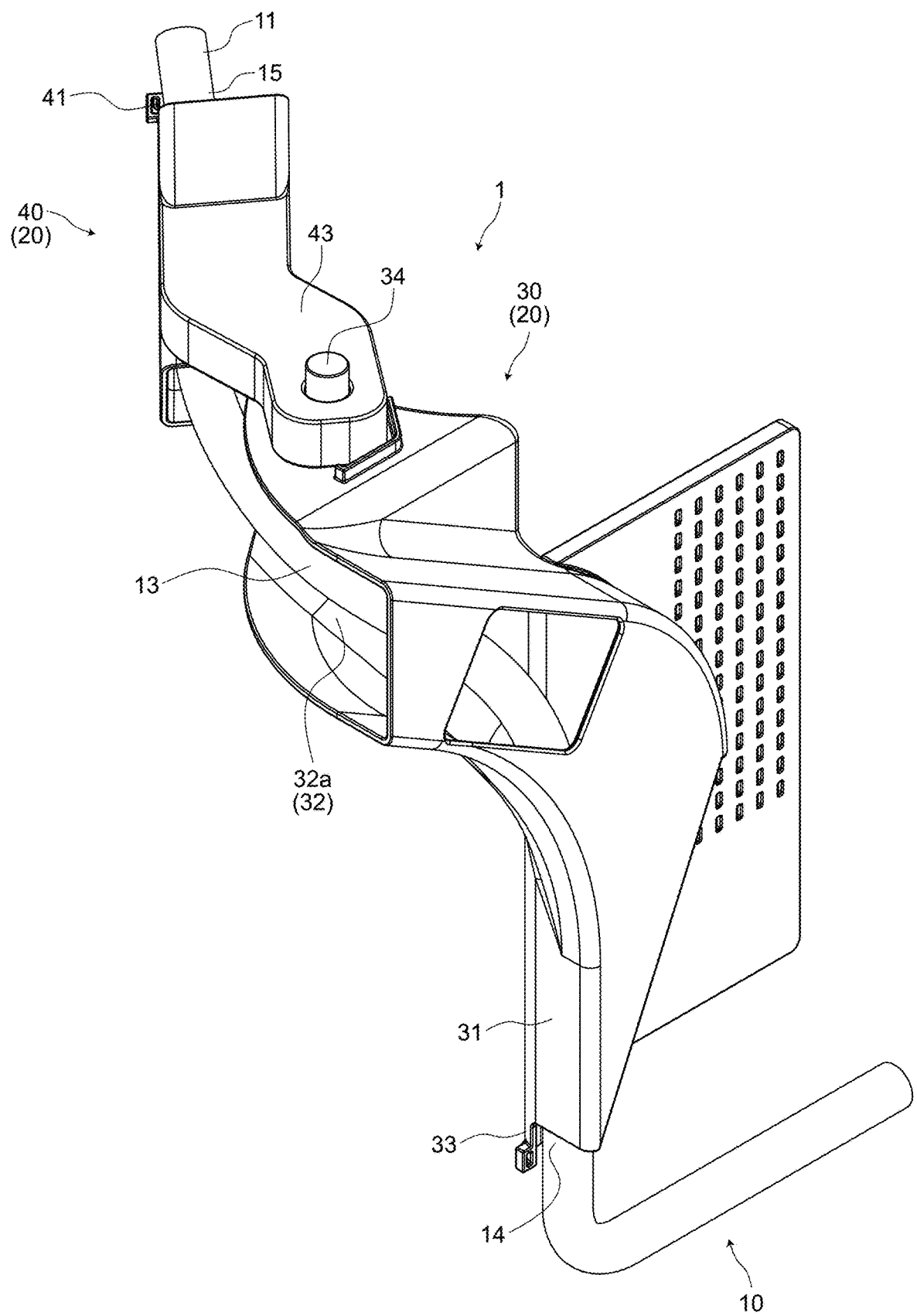
FIG. 9 is a perspective view of the wiring harness according to the embodiment when the slide door is in the fully opened position.
Figure 10:
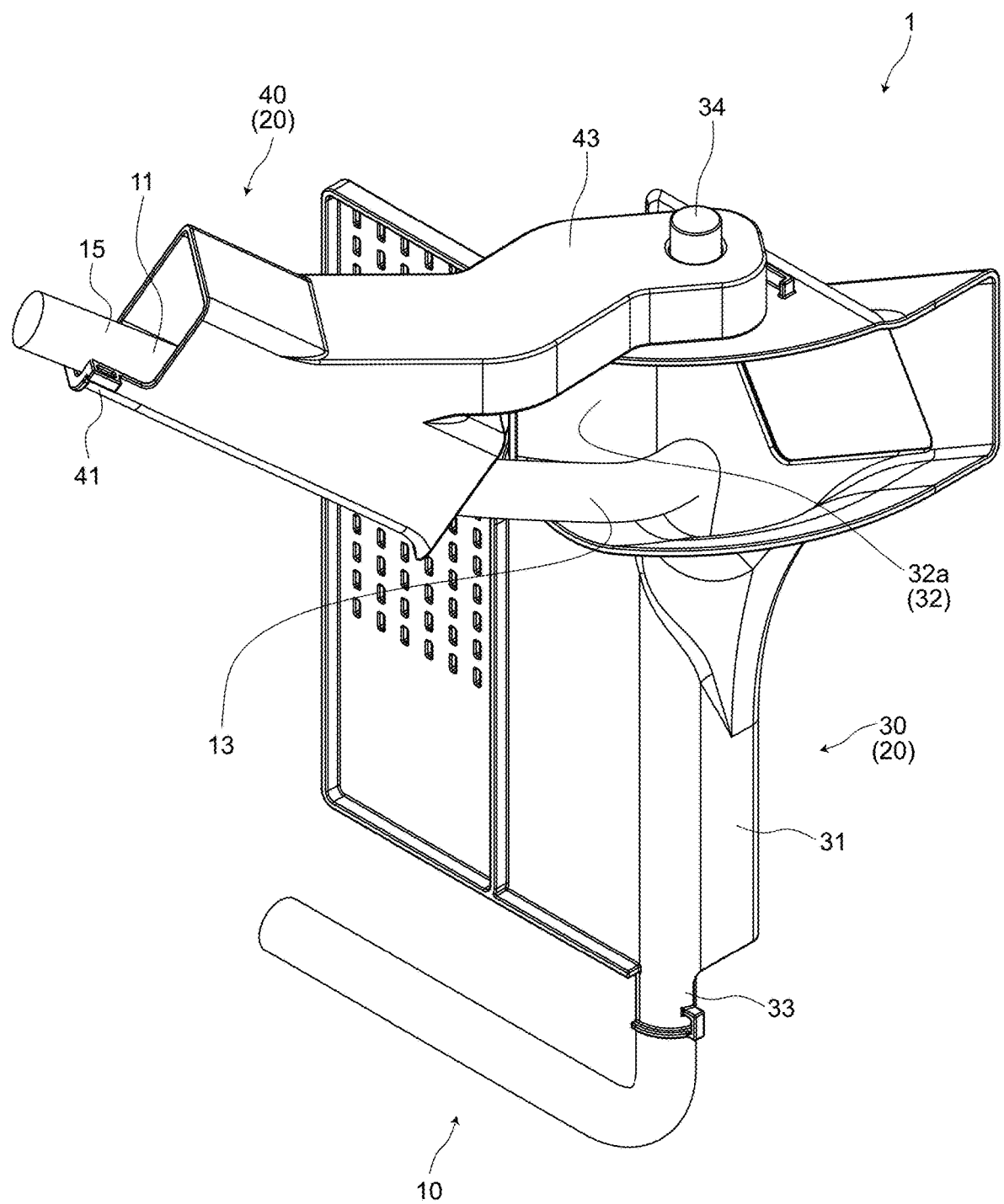
FIG. 10 is a perspective view of the wiring harness according to the embodiment as viewed from a different angle when the slide door is in the fully opened position.
Figure 11:
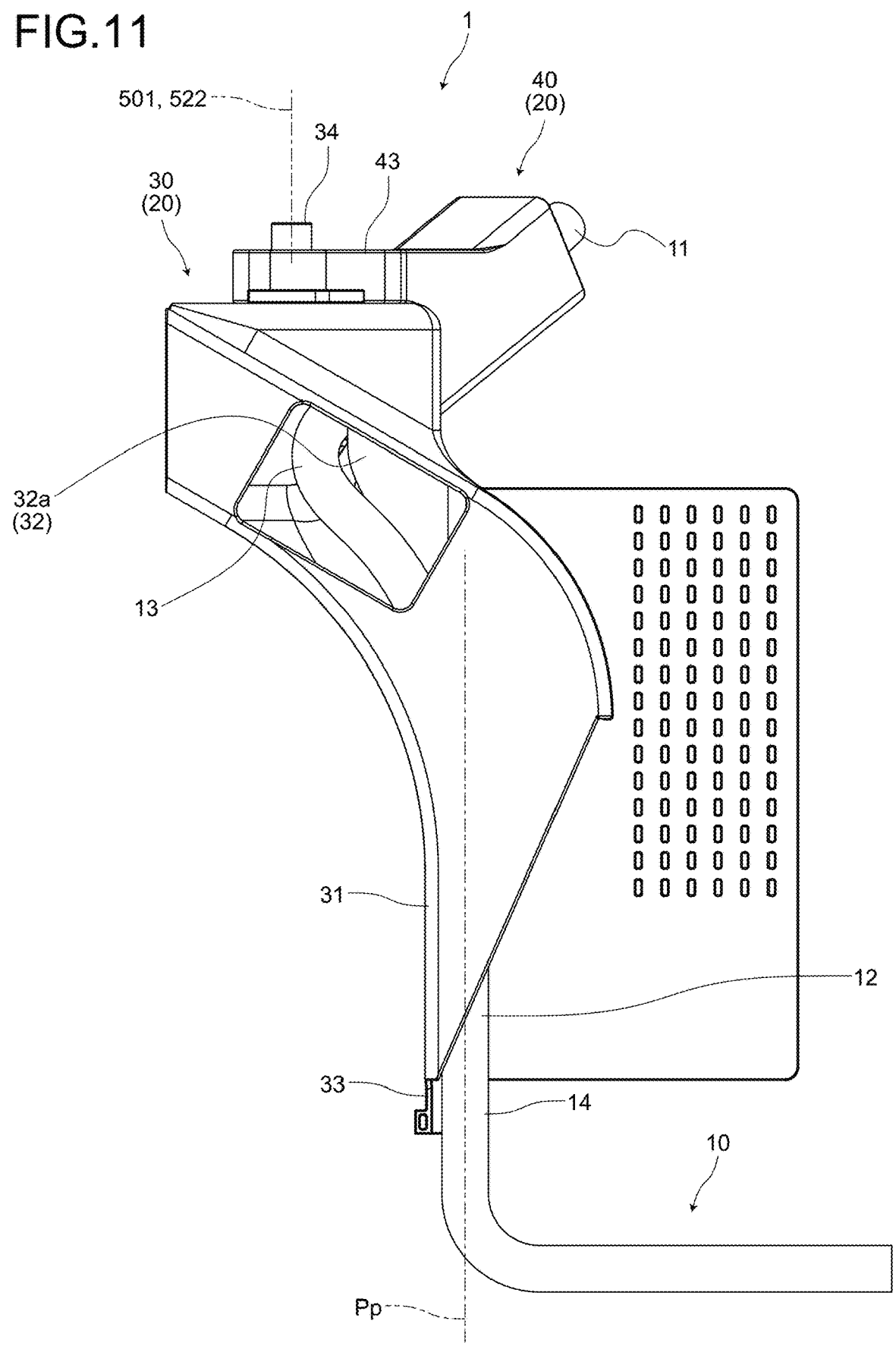
FIG. 11 is a plan view of the wiring harness according to the embodiment as viewed from the vehicle interior when the slide door is in the fully opened position.
Figure 12:
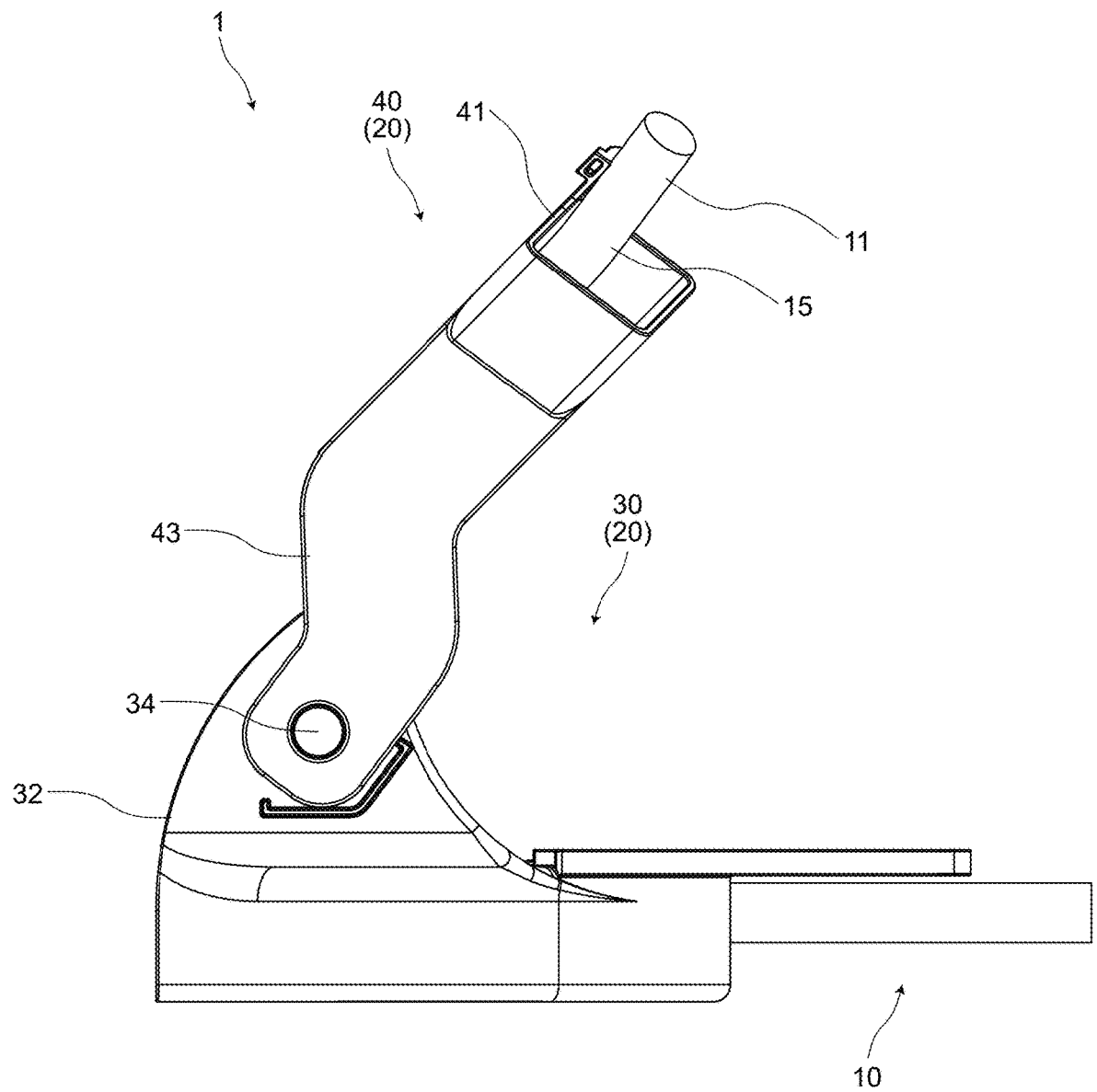
FIG. 12 is a plan view of the wiring harness according to the embodiment as viewed from above the vehicle when the slide door is in the fully opened position.

The main arm member 521 rotates, when opening and closing between the fully closed position (FIGS. 1 and 2) and the fully opened position (FIG. 3), the slide door 510 around the axis of the pivot point 501. The harness body 10 is passed along the main arm member 521 between the vehicle body 500 side and the slide door 510 side during the rotation of the main arm member 521 around the axis of the pivot point 501 due to opening and closing of the slide door 510 (FIGS. 2 to 4). A portion of the harness body 10 along the main arm member 521 is referred to here as an arm routing section 11 (FIGS. 1 to 4). Therefore, in this harness body 10, as described in detail later, the arm routing section 11 has a fixed portion that is fixed to the main arm member 521.

The protector 20 includes a main protector member 30 that is fixed to the vehicle body 500, and introduces the harness body 10 into an inward space thereof (FIGS. 1 to 13). The main protector member 30 is disposed on a routing path of the harness body 10, more closely on the first electrical connection object side than the main arm member 521 is. This main protector member 30 is molded of synthetic resin material or the like.

The main protector member 30 has a torsion-allowing portion 31, the torsion-allowing portion 31 inwardly guides the harness body 10 along a parallel axis Pp spaced parallel to the pivot shaft of the pivot point 501 (the body-side pivot shaft 522), and when the slide door 510 is opened from the fully closed position to the fully opened position, the torsion-allowing portion 31 inwardly allows a torsional deformation of the harness body 10 that follows the rotation of the main arm member 521 (FIGS. 1 to 7, 9 to 11 and 13). The torsion-allowing portion 31 is formed partly or entirely in a tubular shape, and allows a portion that is torsionally deformed (torsionally deformed portion) 12 in the harness body 10 during opening operation of the slide door 510 to be inserted into inside of the tube along the parallel axis Pp (FIGS. 1 to 4, 7, and 11).

The torsion-allowing portion 31 is disposed in a position outside of an operational area S1 of the main arm member 521 during opening and closing of the slide door 510, in a virtual arm operational area S of a circular shape made by rotating 360 degrees the main arm member 521 around the axis of the pivot point 501 (FIG. 4). For example, the main arm member 521 in this example rotates around the axis of the pivot point 501 within a range of the operational area S1 with an obtuse angle when the slide door 510 is opened and closed between the fully closed position and the fully opened position. The torsion-allowing portion 31 is disposed in a position outside of the range of the operational area S1 with the obtuse angle of the main arm member 521, in the virtual arm operational area S.

Specifically, the torsion-allowing portion 31 is disposed on a rotation center side (that is, on the pivot point 501 side) of the virtual arm operational area S, in the position outside of the operational area S1 of the main arm member 521 in the virtual arm operational area S (FIG. 4). More specifically, the torsion-allowing portion 31 is disposed, in the position outside of the operational area S1 of the main arm member 521 in the virtual arm operational area S, on the rotation center side of the virtual arm operational area S, and inside of an outer wall 502 on an opening direction side of the slide door 510 in the vehicle body 500, and on the opening direction side of the slide door 510 than a passenger space Sp in the vehicle interior (FIG. 4).

The main protector member 30 further has a bend-allowing portion 32, the bend-allowing portion 32 allows, while bending, the harness body 10 extracted out from the torsion-allowing portion 31 to the second electrical connection object side, to head to the main arm member 521, and when the slide door 510 is opened from the fully closed position to the fully opened position, inwardly allows bending deformation of the harness body 10 that follows the rotation of the main arm member 521 (FIGS. 1 to 13). The bend-allowing portion 32 is formed partly or entirely in a tubular shape, and allows a portion that is subjected to bending deformation (hereinafter referred to as "bending deformed portion") 13 in the harness body 10 during opening operation of the slide door 510 to be inserted into the inside of the tube (FIGS. 1 to 7, 9 to 11, and 13).

In the harness body 10, a tip pulled out from the bend-allowing portion 32 of the main protector member 30 to the main arm member 521 side follows the rotation of the main arm member 521 around the axis of the pivot point 501 (FIGS. 2 to 4). In this harness body 10, the tip pulled out to the main arm member 521 side follows the rotation of the main arm member 521 around the axis of the pivot point 501 while being routed along the main arm member 521 (FIGS. 2 to 4). Therefore, in the inside of the tube of the torsion-allowing portion 31, when the slide door 510 is opened from the fully closed position to the fully opened position, the torsionally deformed portion 12 of the harness body 10 deforms by torsion around its own axis in accordance with the rotation of the main arm member 521. In the inside of the tube of the bend-allowing portion 32, when the slide door 510 is opened from the fully closed position to the fully opened position, the bending deformed portion 13 of the harness body 10 deforms by bending in accordance with the rotation of the main arm member 521.

The bend-allowing portion 32 has a locking inner wall surface 32a that locks the harness body 10 in the inside of bend due to bending deformation when the slide door 510 is opened from the fully closed position to the fully opened position (FIGS. 5 to 7, 9 to 11 and 13). Therefore, in this wiring harness 1, even if other component is disposed inside the bend of the bending deformed portion 13 in the harness body 10, the bend-allowing portion 32 can prevent interference between the other component and the harness body 10 when the slide door 510 is opened from the fully closed position to the fully opened position.

Here, the locking inner wall surface 32a is formed to have a shape that, when the slide door 510 is opened from the fully closed position to the fully opened position, locks the harness body 10 inside the bend due to the bending deformation, to limit a torsion angle caused by the torsional deformation of the harness body 10 in an inward of the torsion-allowing portion 31 to an angle less than or equal to a specified torsion angle. The specified torsion angle is set to a torsion angle that is capable of suppressing durability deterioration due to the torsional deformation of the harness body 10. For example, here, the specified torsion angle is set to a maximum value of the torsion angle that is capable of suppressing the durability deterioration due to the torsional deformation of the harness body 10. Therefore, the wiring harness 1, even if the slide door 510 is opened and closed repeatedly, can suppress durability deterioration caused by repeating torsional deformation and return from the torsion of the torsionally deformed portion 12 in the harness body 10.

By the way, the specified torsion angle is determined by a path length of the torsionally deformed portion 12 in the harness body 10, and as the path length of the torsionally deformed portion 12 becomes longer, the torsion angle can be set to a greater angle. On the other hand, in the vehicle, the operational area of the main arm member 521 during opening and closing of the slide door 510 has been determined. In the harness body 10, according to an operating angle of the main arm member 521, a swing width of a portion along the main arm member 521 is determined, and according to the swing width, a torsion angle caused by torsional deformation of the harness body 10 in the inward of the torsion-allowing portion 31 is determined. Therefore, the specified torsion angle and the path length of the torsionally deformed portion 12 can be set based on, for example, the swing width of the portion along the main arm member 521 in the harness body 10 (operating angle of the main arm member 521) and a space available for the installation of the torsion-allowing portion 31.

Therefore, the wiring harness 1 allows the locking inner wall surface 32a of the bend-allowing portion 32 to suppress the durability deterioration of the harness body 10 due to the opening and closing of the slide door 510.

The locking inner wall surface 32a is desirably formed to have a shape that, when the slide door 510 is opened from the fully closed position to the fully opened position, locks the harness body 10 inside the bend due to the bending deformation, to limit a curvature caused by the bending deformation of the harness body 10 in an inward of the bend-allowing portion 32 to a value less than or equal to a specified curvature. The specified curvature is set to a curvature that is capable of suppressing durability deterioration due to the bending deformation of the harness body 10. For example, here, the specified curvature is set to a maximum value of the curvature that is capable of suppressing the durability deterioration due to the bending deformation of the harness body 10. Therefore, the wiring harness 1, even if the slide door 510 is opened and closed repeatedly, can suppress durability deterioration caused by repeating bending deformation and return from the bending of the bending deformed portion 13 in the harness body 10. The locking inner wall surface 32a indicated here is formed as an arc-shaped inner wall surface having a curvature less than or equal to the specified curvature, and when the slide door 510 is opened from the fully closed position to the fully opened position, the bending deformed portion 13 of the harness body 10 is subjected to bending deformation along the inner wall surface with the curvature less than or equal to the specified curvature.

The harness body 10 is fixed directly or indirectly to the vehicle body 500 on the first electrical connection object side and directly or indirectly to the main arm member 521 on the second electrical connection object side.

The harness body 10 has a fixed portion (hereinafter referred to as "first fixed portion") 14 that is fixed to a fixed position of the main protector member 30 or the vehicle body 500 at which the harness body 10 extracted from the inward of the torsion-allowing portion 31 to the first electrical connection object side has reached (FIGS. 5 to 7, 9 and 11). The main protector member 30 in this example has a protruding portion 33 protruding from a periphery of the opening on the first electrical connection object side in the torsion-allowing portion 31 at the fixed position (FIGS. 5 to 7, 9 to 11 and 13). The first fixed portion 14 of the harness body 10 is fixed to the fixed position of the main protector member 30 by being wrapped together with the protruding portion 33 with a binding band or an adhesive tape, or by other means. Therefore, the harness body 10 in this example is indirectly fixed to the vehicle body 500 via the main protector member 30.

The harness body 10 also has a fixed portion (hereinafter referred to as "second fixed portion") 15 that is directly or indirectly fixed to a fixed position of the main arm member 521 (FIGS. 5 to 10, 12 and 13). The second fixed portion 15 is provided in the arm routing section 11 of the harness body 10. The harness body 10 can be directly fixed to the main arm member 521 with the arm routing section 11 in line with the main arm member 521 by wrapping with an adhesive tape or clipping at least one portions of the second fixed portion 15 with respect to the fixed positions of the main arm member 521.

In the harness body 10, there exist the torsionally deformed portion 12 and the bending deformed portion 13 between the first fixed portion 14 and the second fixed portion 15, and when the slide door 510 is opened and closed between the fully closed position and the fully opened position, torsional deformation and return deformation from the torsion, and bending deformation and return deformation from the bending occur between the first fixed portion 14 and the second fixed portion 15. In other words, in the harness body 10, when the slide door 510 is opened and closed between the fully closed position and the fully opened position, the path changes between the first fixed portion 14 and the second fixed portion 15. Therefore, the torsion-allowing portion 31 and the bend-allowing portion 32 have their respective internal spaces that are formed to be capable of allowing path changes between the first fixed portion 14 and the second fixed portion 15 of the harness body 10, the path changes being caused by the torsional deformation and the bending deformation of the harness body 10 during opening and closing of the slide door 510. The term "allow path changes" indicated here means that the harness body 10 the path of which changes during opening and closing of the slide door 510 is not caught inwardly by each of the torsion-allowing portion 31 and the bend-allowing portion 32, except when the harness body 10 is in a state of being locked by the locking inner wall surface 32a of the bend-allowing portion 32.

Here, the protector 20 includes a sub protector member 40 that is fixed to the main arm member 521 and introduces, into the inward space along the main arm member 521, the harness body 10 extracted from the bend-allowing portion 32 to the second electrical connection object side (FIGS. 1 to 13). The sub protector member 40 is molded into a tubular shape of synthetic resin material or the like.

The sub protector member 40 is fixed to the main arm member 521, for example, with the tube axis direction facing a direction in which the main arm member 521 extends (FIGS. 1 to 4). For example, the sub protector member 40 may be fixed directly to the main arm member 521, or may be fixed indirectly to the main arm member 521 by being fixed to a bracket (not illustrated) provided to the main arm member 521 by welding or the like.

When the protector 20 includes such a sub protector member 40, the harness body 10 has the second fixed portion 15 that is fixed to a fixed position of the sub protector member 40 or the main arm member 521 at which the harness body 10 extracted from an inward of the sub protector member 40 to the second electrical connection object side has reached. The sub protector member 40 in the example has, as its fixed position, a protruding portion 41 protruding from the periphery of the opening on the second electrical connection object side (FIGS. 5 to 10, FIGS. 12 and 13). The second fixed portion 15 of the harness body 10 is fixed to the fixed position of the sub protector member 40 by being wrapped together with the protruding portion 41 with a binding band, an adhesive tape, or other means. Therefore, the harness body 10 in the example is indirectly fixed to the main arm member 521 with the second fixed portion 15 only at one position, via the sub protector member 40.

The torsion-allowing portion 31 and the bend-allowing portion 32 have their respective internal spaces that are formed, even when the protector 20 includes the sub protector member 40, to be capable of allowing path changes between the first fixed portion 14 and the second fixed portion 15 of the harness body 10, the path changes being caused by the torsional deformation and the bending deformation of the harness body 10 during opening and closing of the slide door 510.

In the harness body 10, such a path change is allowed between the first fixed portion 14 and the second fixed portion 15, so that a path change also occurs in the inward of the sub protector member 40 (that is, the arm routing section 11). And if the harness body 10 has a larger path change on the main protector member 30 side than on the second fixed portion 15 in the arm routing section 11, the second fixed portion 15 may overload the fixed position of the sub protector member 40 or the main arm member 521. In the previous example, the second fixed portion 15 may overload the protruding portion 41 of the sub protector member 40, the binding band, or the like.

Figure 13:
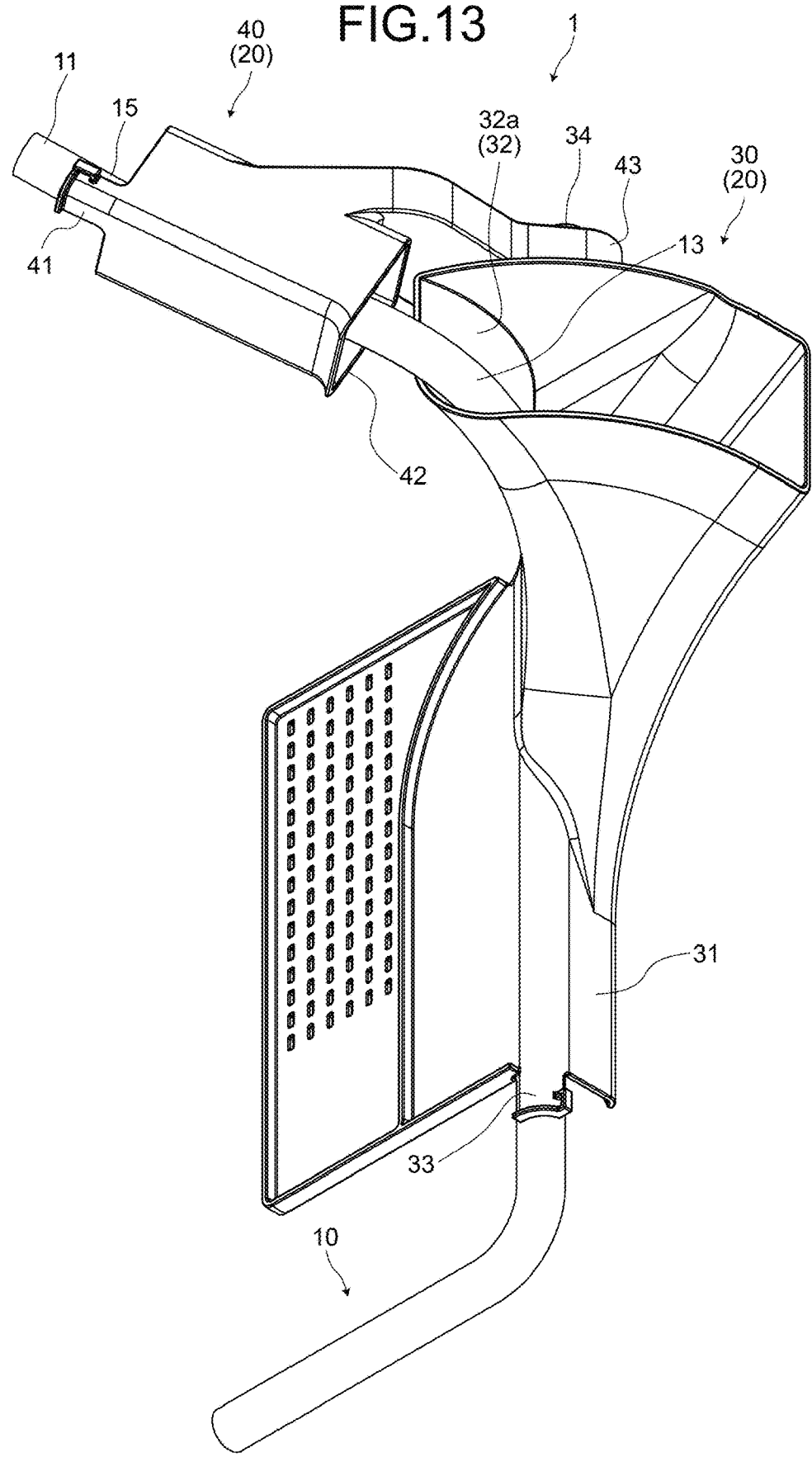
FIG. 13 is an explanatory diagram of a locking part of the wiring harness according to the embodiment as viewed from a different angle when the slide door is in the fully opened position.

Therefore, the sub protector member 40 is provided with a locking part 42 that, when the slide door 510 is opened from the fully closed position to the fully opened position, locks the harness body 10 entering from the first electrical connection object side in the inside of the bend due to the bending deformation inward the bend-allowing portion 32, and reduces a load caused by the path change of the harness body 10 on the fixed position of the sub protector member 40 or the main arm member 521 from the second fixed portion 15 (FIG. 13). The locking part 42, when the slide door 510 is opened from the fully closed position to the fully opened position, locks the harness body 10 entering from the first electrical connection object side in the inside of the bend due to the bending deformation inward the bend-allowing portion 32, to prevent the path change of the harness body 10 (in particular, a path change of the arm routing section 11) from becoming excessively large. Therefore, the locking part 42, when the slide door 510 is opened from the fully closed position to the fully opened position, can suppress overloading from the second fixed portion 15 of the harness body 10, the path of which is changing, on the fixed position of the sub protector member 40 or the main arm member 521. In the previous example, overloading from the second fixed portion 15 on the protruding portion 41 of the sub protector member 40, the binding band, or the like can be suppressed.

Here, the periphery of the opening on the first electrical connection object side in the sub protector member 40 is used as the locking part 42. Therefore, an arc-shaped surface is desirably provided on the periphery to be used as the locking part 42, for example, to make surface contact with the harness body 10.

In the protector 20 of the example, the sub protector member 40 is rotatably held with respect to the main protector member 30. The sub protector member 40 in the example is rotatably held to the bend-allowing portion 32 of the main protector member 30 on the same axis as the pivot shaft of the pivot point 501 (body-side pivot shaft 522). The main protector member 30 has a pivot shaft 34 protruding from the bend-allowing portion 32 on the same axis as the pivot shaft of the pivot point 501 (body-side pivot shaft 522) (FIGS. 5 to 13). The sub protector member 40 has a retaining portion 43 protruding toward the bend-allowing portion 32 (FIGS. 5 to 13). The sub protector member 40 is rotatably held on the same axis as the pivot shaft of the pivot point 501 (body-side pivot shaft 522) with respect to the main protector member 30 by inserting the pivot shaft 34 into the holding portion 43.

As described above, the wiring harness 1 of the present embodiment can suppress the decrease in durability with the protector 20 (main protector member 30, sub protector member 40) of the above-described shape and arrangement.

The wiring harness according to the present embodiment, when the open/close body is opened from the fully closed position to the fully opened position, locks the inside of the bend caused by the bending deformation of the harness body at the locking inner wall surface of the bend-allowing portion in the main protector member, and limits the torsion angle caused by the torsional deformation of the harness body to an angle less than or equal to the specified torsion angle. Therefore, in the wiring harness, even if opening and closing of the open/close body is repeated, durability deterioration caused by repeating torsional deformation and return from the torsion of the harness body can be suppressed.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A wiring harness comprising:
a harness body that is routed across and between a support body and an open/close body, the open/close body being opened and closed while rotating an arm member of a link mechanism around an axis of a pivot point provided on the support body via the link mechanism, and electrically connects a first electrical connection object installed in the support body to the second electrical connection object installed in the open/close body; and
a protector that protects the harness body by introducing the harness body into an inward space thereof, wherein
the harness body is passed along the arm member between the support body side and the open/close body side during the rotation of the arm member around an axis of the pivot point due to opening and closing of the open/close body between a fully closed position and a fully opened position,
the protector includes a main protector member fixed to the support body and introduces the harness body into an inward space,
the main protector member has a torsion-allowing portion, the torsion-allowing portion inwardly guiding the harness body along a parallel axis spaced parallel to the pivot shaft of the pivot point, and when the open/close body is opened from the fully closed position to the fully opened position, inwardly allowing a torsional deformation of the harness body that follows the rotation of the arm member, and a bend-allowing portion, the bend-allowing portion allowing, while bending, the harness body extracted out from the torsion-allowing portion to the second electrical connection object side, to head to the arm member, and when the open/close body is opened from the fully closed position to the fully opened position, inwardly allowing bending deformation of the harness body that follows the rotation of the arm member, and the torsion-allowing portion is disposed in a position outside of an operational area of the arm member during opening and closing of the open/close body, in a virtual arm operational area of a circular shape made by rotating 360 degrees the arm member around the axis of the pivot point.

2. The wiring harness according to claim 1, wherein the torsion-allowing portion is disposed, in a position outside of the operational area of the arm member in the virtual arm operational area, on a rotation center side of the virtual arm operational area.

3. The wiring harness according to claim 1, wherein
the bend-allowing portion has a locking inner wall surface that locks the harness body in the inside of bend due to the bending deformation when the open/close body is opened from the fully closed position to the fully opened position, to limit a torsion angle caused by the torsional deformation of the harness body in an inward of the torsion-allowing portion to an angle less than or equal to a specified torsion angle, and
the specified torsion angle is set to a torsion angle that is capable of suppressing durability deterioration due to the torsional deformation of the harness body.

4. The wiring harness according to claim 2, wherein
the bend-allowing portion has a locking inner wall surface that locks the harness body in the inside of bend due to the bending deformation when the open/close body is opened from the fully closed position to the fully opened position, to limit a torsion angle caused by the torsional deformation of the harness body in an inward of the torsion-allowing portion to an angle less than or equal to a specified torsion angle, and
the specified torsion angle is set to a torsion angle that is capable of suppressing durability deterioration due to the torsional deformation of the harness body.

5. The wiring harness according to claim 1, wherein
the harness body has a first fixed portion that is fixed to a fixed position of the main protector member or the support body at which the harness body extracted from the inward of the torsion-allowing portion to the first electrical connection object side has reached, and a second fixed portion that is fixed to a fixed position of the arm member, and
the torsion-allowing portion and the bend-allowing portion have their respective internal spaces that are formed to be capable of allowing path changes between the first fixed portion and the second fixed portion of the harness body, the path changes being caused by the torsional deformation and the bending deformation of the harness body during opening and closing of the open/close body.

6. The wiring harness according to claim 2, wherein
the harness body has a first fixed portion that is fixed to a fixed position of the main protector member or the support body at which the harness body extracted from the inward of the torsion-allowing portion to the first electrical connection object side has reached, and a second fixed portion that is fixed to a fixed position of the arm member, and
the torsion-allowing portion and the bend-allowing portion have their respective internal spaces that are formed to be capable of allowing path changes between the first fixed portion and the second fixed portion of the harness body, the path changes being caused by the torsional deformation and the bending deformation of the harness body during opening and closing of the open/close body.

7. The wiring harness according to claim 1, wherein
the protector includes a sub protector member that is fixed to the arm member and introduces, into the inward space along the arm member, the harness body extracted from the bend-allowing portion to the second electrical connection object side,
the harness body has a first fixed portion that is fixed to a fixed position of the main protector member or the support body at which the harness body extracted from the inward of the torsion-allowing portion to the first electrical connection object side has reached, and a second fixed portion that is fixed to a fixed position of the sub protector member or the arm member at which the harness body extracted from an inward of the sub protector member to the second electrical connection object side has reached, and
the torsion-allowing portion and the bend-allowing portion have their respective internal spaces that are formed to be capable of allowing path changes between the first fixed portion and the second fixed portion of the harness body, the path changes being caused by the torsional deformation and the bending deformation of the harness body during opening and closing of the open/close body.

8. The wiring harness according to claim 2, wherein
the protector includes a sub protector member that is fixed to the arm member and introduces, into the inward space along the arm member, the harness body extracted from the bend-allowing portion to the second electrical connection object side,
the harness body has a first fixed portion that is fixed to a fixed position of the main protector member or the support body at which the harness body extracted from the inward of the torsion-allowing portion to the first electrical connection object side has reached, and a second fixed portion that is fixed to a fixed position of the sub protector member or the arm member at which the harness body extracted from an inward of the sub protector member to the second electrical connection object side has reached, and
the torsion-allowing portion and the bend-allowing portion have their respective internal spaces that are formed to be capable of allowing path changes between the first fixed portion and the second fixed portion of the harness body, the path changes being caused by the torsional deformation and the bending deformation of the harness body during opening and closing of the open/close body.

9. The wiring harness according to claim 7, wherein the sub protector member is provided with a locking part that, when the open/close body is opened from the fully closed position to the fully opened position, locks the harness body entering from the first electrical connection object side in the inside of the bend due to the bending deformation, and reduces a load caused by the path change of the harness body on the fixed position of the sub protector member or the arm member from the second fixed portion.

10. The wiring harness according to claim 8, wherein the sub protector member is provided with a locking part that, when the open/close body is opened from the fully closed position to the fully opened position, locks the harness body entering from the first electrical connection object side in the inside of the bend due to the bending deformation, and reduces a load caused by the path change of the harness body on the fixed position of the sub protector member or the arm member from the second fixed portion.

\* \* \* \* \*